US012226371B1

(12) United States Patent
Wu et al.

(10) Patent No.: US 12,226,371 B1
(45) Date of Patent: Feb. 18, 2025

(54) FLUID TRANSFER DEVICE

(71) Applicant: Genzyme Corporation, Cambridge, MA (US)

(72) Inventors: Haiming Wu, Weston, MA (US); Dan Ferreira, Woodbridge, CT (US)

(73) Assignee: Genzyme Corporation, Cambridge, MA (US)

(*) Notice: Subject to any disclaimer, the term of this patent is extended or adjusted under 35 U.S.C. 154(b) by 0 days.

(21) Appl. No.: 18/666,417

(22) Filed: May 16, 2024

(51) Int. Cl.
*A61J 1/20* (2006.01)
*A61J 1/14* (2023.01)

(52) U.S. Cl.
CPC ........... *A61J 1/2089* (2013.01); *A61J 1/1406* (2013.01)

(58) Field of Classification Search
CPC .............................. A61J 1/2089; A61J 1/1406
See application file for complete search history.

(56) References Cited

U.S. PATENT DOCUMENTS

| | | | | |
|---|---|---|---|---|
| 4,997,430 | A | 3/1991 | Van der Heiden et al. | |
| 5,466,220 | A | 11/1995 | Brenneman | |
| 6,474,375 | B2 * | 11/2002 | Spero | A61J 1/2089 604/416 |
| 6,558,365 | B2 | 5/2003 | Zinger et al. | |
| 7,326,194 | B2 | 2/2008 | Zinger et al. | |
| 7,896,849 | B2 | 3/2011 | Delay | |
| 8,425,487 | B2 | 4/2013 | Beiriger et al. | |
| 8,562,584 | B2 | 10/2013 | Beiriger et al. | |
| 9,132,061 | B2 | 9/2015 | Beiriger | |
| 9,339,438 | B2 | 5/2016 | Lev et al. | |
| 9,345,643 | B2 | 5/2016 | Okiyama | |
| 10,420,927 | B2 | 9/2019 | Fangrow | |
| 10,688,295 | B2 | 6/2020 | Lev et al. | |
| 10,765,604 | B2 | 9/2020 | Denenburg et al. | |

(Continued)

FOREIGN PATENT DOCUMENTS

| | | |
|---|---|---|
| WO | WO 2004/068820 A2 | 8/2004 |
| WO | WO 2005/018629 A1 | 3/2005 |

(Continued)

OTHER PUBLICATIONS

Hamers-Casterman et al., "Naturally occurring antibodies devoid of light chains," Nature, Jun. 3, 1993, 363(6428):446-448.

(Continued)

*Primary Examiner* — Jason K Niesz
(74) *Attorney, Agent, or Firm* — Fish & Richardson P.C.

(57) ABSTRACT

A fluid transfer device for transferring a fluid between a diluent container and a medicament container includes a body, a first connecting portion to connect to the diluent container, and a second connecting portion to connect to the medicament container. The first connecting portion includes a first fluid channel to fluidically communicate with an interior of the diluent container, and the second connecting portion comprises a second fluid channel to fluidically communicate with an interior of the medicament container. A third fluid channel is configured to fluidically communicate with the interior of the medicament container and with a pump device. The first fluid channel merges into the second fluid channel to form a first flow path from the diluent container into the medicament container and to form a second flow path from the medicament container into the diluent container.

14 Claims, 5 Drawing Sheets

(56) References Cited

U.S. PATENT DOCUMENTS

| | | | | |
|---|---|---|---|---|
| 10,945,921 | B2 | 3/2021 | Denenburg | |
| 11,642,285 | B2 | 5/2023 | Deneburg et al. | |
| 11,786,443 | B2 | 10/2023 | Lev et al. | |
| 2011/0087164 | A1 * | 4/2011 | Mosler | A61J 1/2089 604/87 |
| 2019/0381237 | A1 * | 12/2019 | Desbrosses | A61J 1/2013 |
| 2021/0154097 | A1 | 5/2021 | McLoughlin et al. | |
| 2021/0228446 | A1 * | 7/2021 | Herrmann | A61J 1/2058 |
| 2023/0052165 | A1 | 2/2023 | Bar-El et al. | |

FOREIGN PATENT DOCUMENTS

| | | | |
|---|---|---|---|
| WO | WO 2006/003388 | A2 | 1/2006 |
| WO | WO 2006/030220 | A1 | 3/2006 |
| WO | WO 2007/017868 | A1 | 2/2007 |
| WO | WO 2020/208626 | A1 | 10/2020 |

OTHER PUBLICATIONS

Holt et al., "Domain antibodies: proteins for therapy," Trends in Biotechnology, Nov. 2003, 21(11):484-490.

Muyldermans, "Single domain camel antibodies: current status," Reviews in Molecular Biotechnology, Jun. 2001, 74(4):277-302.

Needle-based injection systems for medical use Requirements and test methods, Part 1: Needle injection systems, ISO 11608-1:2014(E), Third Edition, Switzerland, ISO, Dec. 15, 2014, pp. 1-13.

Ward et al., "Binding activities of a repertoire of single immunoglobulin variable domains secreted from *Escherichia coli*, " Nature, Oct. 1, 1989, 341(6242):544-546.

U.S. Appl. No. 18/666,320, filed May 16, 2024, Haiming Wu.

U.S. Appl. No. 18/666,279, filed May 16, 2024, Haiming Wu.

U.S. Appl. No. 18/666,379, filed May 16, 2024, Haiming Wu.

* cited by examiner

FLUID TRANSFER DEVICE

TECHNICAL FIELD

The present disclosure relates to the field of fluid transfer devices, specifically, to fluid transfer devices configured for transferring a fluid between a diluent container and a medicament container, e.g., for preparing or reconstituting a liquid medicament and/or for administering a medicament by way of injection or infusion. In another aspect the present disclosure relates to a kit comprising a fluid transfer device. In still another aspect the disclosure relates to methods of transferring a fluid between a diluent container and a medicament container, e.g., for the purpose of preparing a reconstitutable medicament, for reconstituting a reconstitutable medicament and/or/for administering a reconstituted liquid medicament.

BACKGROUND

Patients suffering from certain diseases like, for example, haemophilia or requiring enzyme replacement therapy have to take regular intravenous (IV) infusions. The infusions often have to be mixed and prepared, sometimes to the specific needs of the patient, (and sometimes a short time before drug administration) which may include reconstitution of the drug powder from multiple vials using an exact amount of sterile liquids like water and/or saline. As this preparation process is typically complex and tedious, it is usually performed by a health care professional in a clinic or pharmacy, potentially using lab equipment.

Generally, administering a medicament by way of infusion may require a rather clean or sterile environment. A patient may therefore have to regularly visit an ambulance or health care center.

Self-medication or home-medication for administering a medicament through infusion or injection is and remains quite challenging but is very attractive for patients thereby avoiding problems and circumstances involved in visiting a health care center. With home- or self-medication a patient or user, e.g. intending to establish a vascular access to a patient's body, may be obliged to use only one hand, which might be rather cumbersome and thus challenging.

In addition, it is often required to establish or maintain a clean and/or sterile environment especially in the field of home-medication or self-medication as well as providing of a clean and sterile storage environment for medicaments and medicament containers, medical device accessory and medical devices.

It is therefore desirable to provide improvements in the field of home medication or self-medication, which allow a user or caregiver to prepare and to administer a medicament by way of injection or infusion. It is further desirable to provide an improved storage and transportation of medical devices, medicaments, medical device accessory and the like components required for home- or self-medication. Furthermore, there should be provided improvements in guiding and assisting a user in conducting or executing numerous steps in the course of preparing medicaments and/or in the course of preparing administering of a medicament, e.g. by way of infusion or injection.

Some medicaments to be administered by injection or infusion may be provided in a co-called injection vial, either in liquid or powdered form. Such injection vials typically comprise a barrel filled with the medicament either in a liquid or powdered form. The barrel is typically sealed towards an outlet by a pierceable stopper. The pierceable stopper may be fixed to a barrel head, which may also provide a mechanical fastening for a vial adapter.

Vial adapters are widely known in the art and may provide a well-defined fastening to the barrel head of an injection vial. They may comprise a spike to penetrate the pierceable stopper sealing the outlet of the injection barrel. The spike is typically in fluid communication with a connector, e.g. implemented as a standardized connector that may provide a mechanical fastening of an injection device so that the liquid content provided inside the injection vial can be withdrawn by the injection device, e.g. by a syringe or the like medicament container connectable to the vial adapter.

Controlling of an amount of a diluent to be withdrawn from a diluent container and/or controlling of an amount of reconstituted liquid medicament to be introduced into a diluent container or into one of an infusion container or medicament delivery container might be elaborate. Generally, a syringe may be used for withdrawing a well-defined amount of a diluent from a diluent container and to introduce a well-defined amount of the diluent into a medicament container for reconstituting the medicament. Use of a separate syringe for withdrawing and expelling liquid substances requires respective skills of an operator or user. Also, connecting and disconnecting a syringe with regard to diluent containers or medicament containers may be always accompanied by a non-neglectable risk of contamination. It is therefore desirable to improve a transfer of a fluid between a diluent container and a medicament container for both, reconstituting a medicament and for providing the reconstituted medicament to a delivery assembly, a delivery device or to an infusion container, such as an infusion bag.

The above-mentioned disadvantages and shortcomings are solved by a fluid transfer device, by a kit, e.g. implemented as an infusion kit, and by methods of transferring a fluid between a diluent container and a medicament container in accordance to the features of the independent claims. Various examples and embodiments are subject matter of the dependent claims, respectively.

SUMMARY

In one aspect the present disclosure relates to a fluid transfer device for transferring a fluid between a diluent container and a medicament container. The fluid transfer device comprises a body. The fluid transfer device further comprises a first connecting portion configured to connect to the diluent container. The first connecting portion comprises a first fluid channel to fluidically communicate with an interior of the diluent container. The first fluid channel is typically in fluid communication with the interior of the diluent container when the first connecting portion of the fluid transfer device is connected to the diluent container.

The fluid transfer device further comprises a second connecting portion configured to connect to the medicament container. The second connecting portion comprises a second fluid channel to fluidically communicate with an interior of the medicament container. Typically, the second fluid channel is in fluid communication with the interior of the medicament container when the second connecting portion is connected to the medicament container.

The fluid transfer device further comprises a third fluid channel to fluidically communicate with the interior of the medicament container and to fluidically communicate with a pump device. The pump device may be provided as a separate device to be connected to or being connectable with the fluid transfer device. In some examples the pump device may be integrated into the fluid transfer device. Then, the pump device may provide or comprise a portion or pump section of the fluid transfer device.

Typically, the third fluid channel is in fluid communication with the interior of the medicament container when the medicament container is connected to the second connecting portion of the fluid transfer device. The third fluid channel is further in fluid communication with the pump device.

The first fluid channel merges into the second fluid channel to form a first flow path from the diluent container into the medicament container and to form a second flow path from the medicament container into the diluent container.

The mutual merging of the first fluid channel and the second fluid channel forms a bi-directional fluid path between the diluent container and the medicament container. A fluid provided in the diluent container is allowed to flow along the first flow path from the diluent container into the first fluid channel, from the first fluid channel into the second fluid channel and further into the interior of the medicament container. The merging of the first fluid channel and the second fluid channel further provides a flow of a fluid in an opposite direction, hence from the medicament container towards and into the diluent container or towards a separate medicament administering container to be connected to the first connecting portion instead of the diluent container.

Here, the fluid may flow from the medicament container back into the second fluid channel, from the second fluid channel into the first fluid channel and from the first fluid channel back into the diluent container or into the optional administering container.

By providing first and second fluid paths along the first fluid channel and the second fluid channel in opposite directions, the fluid transfer device can be used for both, withdrawing of a diluent from the diluent container and for transferring the diluent from the diluent container into the medicament container. There, the diluent may be used to dilute, dissolve and/or to reconstitute a medicament, which may be provided in freeze-dried configuration inside the medicament container. In some examples the medicament container contains a lyophilized medicament, e.g. in powdered form or in form of a freeze-dried cake.

Transferring a liquid diluent into the medicament container may serve to reconstitute a liquid medicament. By way of the second flow path the medicament may then be re-transferred from the medicament container towards and into the diluent container or into a separate administering container to be connected to the first connecting portion instead or in addition to the diluent container.

In this way, the fluid transfer device provides a bi-directional transfer of a liquid substance. It provides a rather universal exchange of an amount of a liquid diluent or liquid medicament between the diluent container and the medicament container. In this way, a lyophilized medicament or a dilutable medicament initially provided inside the medicament container can be easily reconstituted or diluted without the necessity to disconnect or to reconnect the connecting portions of the fluid transfer device with any of the diluent container and the medicament container. Rather, the medicament container, the diluent container and the optional pump device can remain connected in a fluid-transferring manner.

In some examples the first fluid channel, the second fluid channel and/or the third fluid channel are provided inside the body of the fluid transfer device. Any of the first, the second and the third fluid channels may be provided as a hollow bore extending into or through the body of the fluid transfer device. In some examples the body comprises an injection molded plastic part. The body may comprise a single body made of a single or integrally formed material.

In other examples the body comprises multiple parts that are assembled together.

In some examples, any of the first, the second and the third flow channels is void of a check valve or the like directional flow limiter. In this way the various flow channels may provide a flow of a fluid in opposite directions between the medicament container and the diluent container. The absence of check valves or the like flow limiters provides a rather elegant and easy as well as cost efficient design of the fluid transfer device.

The pump device may be connectable in a fluid communicating manner to the third fluid channel. The pump device is configured to provide a negative pressure and/or to provide a positive pressure to the third fluid channel. The pump device may be configured to apply a suction effect onto the third fluid channel. In some examples the pump device is configured for a detachable fastening or fixing to a proximal end of the third fluid channel in order to apply a positive or negative pressure to the respective fluid channel.

By applying a negative pressure to the third fluid channel a respective negative pressure may be transferred into the interior of the medicament container. When the medicament container is further in fluid communication with the second and first fluid channels and when the second fluid channel is in fluid communication with an interior of the medicament container such a suction effect and hence transferring of a negative pressure into the interior of the medicament container may cause withdrawing of an amount of the diluent from the interior of the diluent container through the first fluid channel into the second fluid channel and further into the medicament container.

Likewise, and in an opposite sense it is also possible to apply a positive pressure to the third fluid channel by way of the pump device. Then, the positive pressure may be transferred via the third fluid channel into the interior of the medicament container. A positive pressure applied to the interior of the medicament container may serve to expel a liquid provided in the medicament container into the second fluid channel and further into the first fluid channel and finally back into the diluent container.

In some examples it may be provided that the third fluid channel is subject to a positive gas pressure or is subject to a negative gas pressure by way of the pump device. Hence, the third fluid channel may be particularly configured to increase or to decrease a partial gas pressure inside the interior of the medicament container.

In some examples and depending on the orientation of the medicament container relative to the second fluid channel there can be transferred a respective fluid pressure or gas pressure into the second fluid channel by way of which a fluid can be either withdrawn from the diluent container into the medicament container along the first flow path, or, a respective fluid can be transferred from the medicament container towards and into the diluent container along the second flow path.

The fluid transfer device provides a rather easy and intuitive operation when duly connected with the diluent container, the medicament container and the pump device. Here, the pump device may be initially operated to generate a negative pressure by way of which an amount of the diluent can be withdrawn into the interior of the medicament container. It may be then and upon inverting the orientation of the medicament container with regard to the direction of gravity and by applying a positive pressure by way of the pump device towards and into the third fluid channel that a portion of the liquid contained inside the medicament container can be expelled from the medicament container due to an increased pressure level inside the medicament container, which pressure increase is applied or provided to the medicament container by the pump device and the third fluid channel.

Insofar, the fluid transfer device provides withdrawing and transferring of a liquid substance from and into the diluent container without the necessity of disconnecting or reconnecting any of the fluid transferring portions of the fluid transfer device, the diluent container, the medicament container or the pump device. In this way, rather sterile conditions may be maintained during the process of transferring the fluid between the diluent container and the medicament container.

In some examples, the pump device may be operated such that the pump device and/or the third fluid channel may not get into a fluid transferring contact with the fluid of the diluent or reconstituted medicament.

According to a further example the second connecting portion comprises a medicament container spike, which is configured to penetrate a pierceable seal of the medicament container. The medicament container spike may be of elongated shape. It may be configured to pierce a pierceable seal, e.g. a pierceable stopper or septum of the medicament container in the course of connecting the medicament container to the second connecting portion of the fluid transfer device.

The second connecting portion may be implemented as a kind of a vial adapter. Here, the medicament container may be implemented as a medicament vial. The medicament container spike may protrude into a receptacle of the second connecting portion. It may be aligned or may be oriented in a longitudinal direction, which longitudinal direction may extend parallel or counter parallel to an inserting direction along which the medicament container is to be inserted into the second connecting portion, hence, into a receptacle provided at the second connecting portion of the fluid transfer device.

By way of the medicament container spike there can be provided a straightforward fluid communication between the second fluid channel and the interior of the medicament container upon or during establishing a mechanical connection between the second connecting portion and the medicament container.

According to a further example the second fluid channel comprises a distal end and the second fluid channel extends through or into the medicament container spike. The distal end of the second fluid channel terminates in a first spike aperture. Hence, the second fluid channel terminates inside or at the medicament container spike. Typically, a distal end of the second fluid channel aligns or terminates in the first spike aperture. In this way, a liquid substance may flow from a proximal portion of the second fluid channel towards and into the distal end of the second fluid channel and from there through the first spike aperture into the interior of the medicament container when the medicament container is attached to the second connecting portion.

According to another example the third fluid channel comprises a distal end and the third fluid channel extends through or into the medicament container spike separate from the second fluid channel. The distal end of the third fluid channel terminates in a second spike aperture. The second fluid channel and the third fluid channel may extend parallel inside the medicament container spike. They may both terminate with their distal ends in respective first and second spike apertures. Apart from that the second fluid channel and the third fluid channel are fluidically disconnected from each other.

In some examples, and only when the distal end of the medicament container spike is located inside the interior of the medicament container the distal ends of the third fluid channel and the second fluid channel are in a fluid transferring or hydrostatic communication through the interior of the medicament container. In this way there can be applied a negative pressure via the third fluid channel into the interior of the medicament container, which negative pressure may then transfer into the second fluid channel.

Vice versa, via the third fluid channel there may be also provided a positive pressure into the interior of the medicament container, which positive pressure may be used to expel a liquid fraction or an amount of a liquid located inside the medicament container, which fluid may be in flow communication with the first spike aperture. In this way and by introducing, e.g., a gaseous substance via the third fluid channel and via the second spike aperture into the interior of the medicament container this positive pressure may be used to expel or to purge a liquid substance contained inside the medicament container and in fluid communication with the first spike aperture into the second fluid channel, further into the first fluid channel and further into the diluent container.

In a further example the first spike aperture is longitudinally offset from the second spike aperture with regard to a longitudinal extent of the medicament container spike. In this way and specifically when the medicament container is held upside down, such that a liquid located inside the interior of the medicament container is at the side or outlet end of the medicament container that is in fluid communication with the fluid transfer device, it can be provided that the third fluid channel and hence the second spike aperture may be in fluid communication with a gaseous fraction of the interior of the medicament container and that the first spike aperture and hence the second fluid channel is in fluid communication with the liquid fraction of the substance located inside the interior of the medicament container.

Accordingly, and in another example the medicament container spike comprises a distal spike end, e.g., forming a free end of the medicament container spike. A longitudinal distance between the second spike aperture and the distal spike and may be smaller than a longitudinal distance between the first spike aperture and the distal spike end. In other words, the first spike aperture is located further away from the distal spike end than the second spike aperture. In a typical example and when the medicament container spike has penetrated a pierceable seal of the medicament container it may be provided that the first spike aperture is located pretty close to an inside surface of the seal of the medicament container or that the first spike aperture even aligns with an inside surface of the seal, whereas the second spike aperture is located at a larger longitudinal distance from an inside surface of the seal or closure of the medicament container.

In some examples and depending on the fill level or fluid level inside the medicament container and when the medicament container is held upside down, i.e., with the pierceable seal located at a lower most portion or facing downwardly, it may be provided that the first spike aperture is located inside a liquid fraction of the content of the medicament container whereas the second spike aperture protrudes outwardly from a liquid fraction or liquid level, such that the second spike aperture is in fluid communication with a gaseous fraction or gaseous portion of the interior of the medicament container. In this way, there may be applied a positive gas pressure via the pump device into the third fluid channel, which may then cause expelling of an amount of the liquid located inside the interior of the medicament container through the first spike aperture into the second fluid channel and further into the first fluid channel and even further into the diluent container or into the administering container connected to an opposite end of the first fluid channel.

In a further example the fluid transfer device comprises a fourth fluid channel to fluidically communicate with the pump device. The fourth fluid channel merges into the third fluid channel to form a third flow path from the medicament container into the pump device and to form a fourth flow path from the pump device into the medicament container. In some examples the liquid- or gas-transferring connection between the pump device and the fourth fluid channel serves to apply a negative pressure onto the third fluid channel and/or to apply a positive pressure onto the third fluid channel.

Along the third flow path there is typically provided a negative fluid- or gas pressure by the pump device onto the fourth and hence onto the third flow channel. Along the fourth flow path the pump device may provide a positive pressure onto the fourth fluid channel and hence onto the third fluid channel, which may be in permanent fluid communication with the third fluid channel.

In some examples the first fluid channel and the fourth fluid channel may extend parallel to each other or may substantially align in longitudinal direction. They may be fluidically separated from each other. Also, the second fluid channel and the third fluid channel may extend parallel to each other. The first fluid channel and the second fluid channel may extend at a predefined angle, e.g. at an angle of 90°. Likewise, the third fluid channel and the fourth fluid channel may also extend at a predefined angle relative to each other, e.g., by 90°. Both, the first and the second fluid channels and the third and the fourth fluid channels may be implemented as an L-shaped channel structure. The second fluid channel and the third fluid channel may exclusively get in fluid communication via the interior of the medicament container when the medicament container is duly attached to the second connecting portion of the fluid transfer device.

According to some examples also the fourth flow channel is void of a check valve. The entire fluid transfer device may be void of any check valves or the like flow limiters.

According to another example the fluid transfer device comprises a third connecting portion fluidically coupled to the third fluid channel. The third connecting portion comprises a mechanical connector, which is configured to connect with a mechanical counter connector of the pump device in a fluid transferring manner. By providing a third connecting portion at the body or in the body of the fluid transfer device, the fluid transfer device serves to fluidically connect the diluent container, the medicament container and the pump device with each other.

The fluid transfer device may be selectively engageable with any of the diluent container, the medicament container and the pump device. In some examples the pump device may be exclusively configured to apply a positive pressure or a negative pressure onto the fourth fluid channel and hence onto the third fluid channel. Typically, the pump device, when duly connected with the third connecting portion of the fluid transfer device serves to apply a positive or negative pressure onto the third fluid channel always via the fourth fluid channel.

In some examples the pump device may be exclusively configured to apply either a negative or positive gas pressure onto the fourth and hence onto the third fluid channel by way of which a liquid substance can be either withdrawn from the diluent container along the first fluid channel and or can be expelled from the medicament container towards and into the diluent container along the second flow path due to a positive pressure applied or provided by the pump device.

Specifically, and by applying a negative gas pressure along the third flow path there can be established or generated a flow of a liquid along the first flow path. By applying a positive pressure by the pump device along the fourth flow path there may be established or generated a flow of a fluid along the second flow path.

In some examples the mechanical connector and the mechanical counter connector of the third connecting portion and of the pump device respectively comprise mutually corresponding standardized fluid transferring connectors, such as male and female Luer-type connectors. In this way, there can be established a detachable fluid communicating interconnection between the third connecting portion and the pump device on demand.

According to another example the first connecting portion comprises a diluent container spike, which is configured to penetrate a pierceable seal of the diluent container. The first fluid channel extends into or through the diluent container spike. The diluent container spike may comprise a spike lumen, which is in permanent fluid communication with the first fluid channel. Hence, a proximal end of the first fluid channel way merge into a distal end of the spike lumen of the first connecting portion.

The diluent container spike may be configured to penetrate a seal, e.g., a pierceable seal of the diluent container. Typically, the diluent container may be implemented as a flexible bag. It may comprise one or several ports or port structures that are complementary shaped to the diluent container spike, and which are configured to become pierced by the diluent container spike. By withdrawing the diluent container spike the respective ports or pierceable seal of the diluent container may automatically re-seal.

In further examples the first connecting portion may comprise a standardized connector to be fluidically connected or coupled with a complementary shaped standardized counter connector of the diluent container.

Also, the first connecting portion may comprise a standardized connector, such as a Luer-type connector configured to connect in a fluid transferring manner with a complementary shaped counter connector of the diluent container. The connector of the first connecting portion and the connector of the diluent container may be implemented as standardized fluid-transferring connectors, such as male and female Luer-type connectors.

According to another example the second connecting portion comprises a cup-shaped receptacle, which is confined by a bottom and by a sidewall. The cup-shaped receptacle is shaped and configured to receive a barrel head of a barrel of the medicament container. Here, the second connecting portion may be implemented as a kind of a vial adapter, specifically, when the medicament container comprises a vial.

The medicament container may comprise a tubular-shaped barrel comprising or made of a vitreous material, such as glass. In some examples the barrel may comprise a plastic material, such as cyclo-olefin copolymer (COC). The barrel of the medicament container may comprise a kind of a bottle, which is open towards a longitudinal outlet end. The outlet end may be provided with a radially narrowing shoulder portion merging into a radially narrowed neck portion. The radially narrowed neck portion may further merge into a radially widened head, e.g., into a radially widened barrel head of the barrel of the medicament container. Such a barrel head may be sealed by the pierceable seal.

The pierceable seal may comprise a rubber septum or any other kind of a pierceable septum made of an elastomeric or otherwise pierceable material to be penetrated by the medicament container spike of the fluid transfer device. The cup-shaped receptacle of the second portion may comprise a tubularly-shaped sidewall, e.g. forming or constituting a kind of a skirt. The sidewall may comprise a number of sidewall segments, which may be radially deformable so as to an allow or to enable a snap fitting engagement with the barrel head of the barrel of the medicament container.

At least some of the sidewall segments comprise a snap feature, e.g. at their free end facing radially inwardly. The snap feature(s) may be sized and configured to snap under the barrel head when the medicament container is inserted in longitudinal direction, i.e., along the longitudinal extent of the medicament container spike into the cup-shaped receptacle of the second connecting portion. When reaching a final assembly configuration, the resiliently deformable sidewall segments may return into an initial configuration thereby establishing a form-fitting engagement with the stepped down portion of the barrel head. In this way there can be provided a snap-fit engagement between the medicament container and the second connecting portion.

The sidewall segments are provided with radially inwardly protruding snap features at or near their free end and they may be further provided with a beveled edge by way of which there may be induced a radially outwardly directed resilient deformation or pivoting movement of the sidewall segments as the medicament container is inserted into the cup-shaped receptacle of the second connecting portion with a barrel head.

When reaching a final assembly configuration, e.g., in which the snap features of the sidewall segment engage with the barrel head and/or wherein a distal end face of the medicament container, e.g., the pierceable abuts with a bottom of the receptacle. Typically, the medicament container spike protrudes or projects from the bottom into the interior of the cup-shaped receptacle. The medicament container spike may be arranged in a radial center of the tubularly-shaped sidewall of the cup-shaped receptacle. The individual sidewall segments may be separated by a longitudinally extending slit extending from the free end of the sidewall towards the bottom In another aspect there is also provided a kit, e.g., implemented as a medicament preparation kit. The kit comprises a fluid transfer device as described above. The kit further comprises or includes a diluent container connectable or connected to the first connecting portion of the fluid transfer device. The diluent container contains a diluent or a respective liquid substance, e.g., water for injection. The kit further comprises a medicament container, which is connectable or which is connected to the second connecting portion of the fluid transfer device. The kit further comprises a pump device connectable or connected to the third fluid channel of the fluid transfer device. The pump device may be directly or indirectly connected to the third fluid channel. It may be in fluid communication with the third fluid channel via a fourth fluid channel in a way as described above. Since the kit comprises a fluid transfer device as described above, all effects, features and benefits as described above in connection with the fluid transfer device equally apply to the kit; and vice versa.

In some examples the pump device comprises a syringe, e.g. a manually operable syringe. The syringe may comprise a mechanical counter connector configured to fluidically connect to the third connecting portion of the body of the fluid transfer device. In further examples the syringe may be integrally formed with the body of the fluid transfer device. The syringe may comprise a tubular-shaped barrel and a plunger longitudinally movable relative to the barrel inside the barrel. The plunger may seal the interior of the barrel towards a direction opposite to the outlet or inlet end and hence opposite to the mechanical counter connector of the syringe or pump device.

The barrel of the syringe may be provided with a visual scale, e.g., extending along the longitudinal direction of the syringe barrel. In this way, and with a transparent or semi-transparent barrel of the syringe, the amount of a liquid drawn into the syringe barrel or expelled from the syringe barrel can be precisely controlled.

In some examples the pump device comprises a manually operable pump device. Here, a user may have to provide an operation force to generate at least one of a positive or negative pressure to the third fluid channel of the fluid transfer device. A manually operable pump device, such as a syringe, is rather easy and cost efficient to implement and may provide an immediate and intuitive control and feedback for withdrawing or expelling a liquid substance.

In some examples the pump device comprises an electro-mechanical pump device. Here, the pump device may comprise an electrically operated drive by way of which at least one of a positive or negative pressure can be generated, e.g., by activating the electric drive.

In some examples the medicament container contains a lyophilized or dry-frozen medicament. The medicament container comprises a lyophilized medicament or drug inside the barrel.

In some examples the medicament container contains a liquid medicament that requires further dilution or mixing with a diluent. Here, a mixing or diluting may take place in any one of the medicament container and the diluent container. In some examples the liquid medicament may be transferred from the medicament container towards and into the diluent container. In other examples, the diluent or a portion of the diluent initially provided in the diluent container is transferred into the medicament container. Subsequently, the diluted medicament may be then re-transferred into the diluent container or into a separate administering container.

In general, the fluid transfer device and the methods as described herein can be used in connection with any two fluid containers. The fluid transfer device can be connected with its first connecting portion to a first container. It can be connected with its second connecting portion to a second container. A fluid initially located in one of the first container and the second container can be transferred into the other one of the first container and the second container, e.g., by flipping the fluid transfer device between two different orientations with respect to gravity. is in its first configuration. By turning the fluid transfer device upside down and by applying an inverted pressure by the pump device the direction of a fluid transfer between a first container and a second container connected to the first and to the second connecting portions of the fluid transfer device can be selectively inverted.

In further examples it is even conceivable to mix multiple medicaments by transferring a liquid substance between any two containers connected to the first and to the second connecting portions of the fluid transfer device. It is even conceivable to connect numerous or several liquid containing containers or liquid receiving container to one of the first connecting portion or second connecting portion of the fluid transfer device, e.g. by making use of a fluid guiding structure, such as an infusion line, e.g., provided with a least one valve, a switch or manifold.

According to a further aspect the present disclosure also relates to a method of transferring of a fluid the from a diluent container into a medicament container by using a fluid transfer device. In one example the method comprises the steps of using and/or providing a fluid transfer device, connecting a first connecting portion of the fluid transfer device to the diluent container and fluidically connecting a first fluid channel of the first connecting portion with an interior of the diluent container. The method further includes the step of connecting a second connecting portion of the fluid transfer device to the medicament container and fluidically connecting a second fluid channel of the second connecting portion with an interior of the medicament container.

Thereafter, i.e., after having connected the diluent container and the medicament container to the fluid transfer device there is applied a negative pressure to a third fluid channel of the fluid transfer device, which is in fluid communication with the interior of the medicament container. Due to the negative pressure at the third fluid channel, there is then transferred a first amount of a fluid located in the diluent container through the first fluid channel into the second fluid channel towards and into the medicament container.

Application of negative pressure to the third fluid channel may include attaching of a pump device to a third connecting portion of the fluid transfer device, such that the pump device is in fluid communication with the third fluid channel. Optionally, the pump device may be fluidically connected to the third fluid channel via a fourth fluid channel. Operating of the pump device may then apply the negative pressure, which causes transferring of a portion of the fluid from the diluent container through the first and second fluid channels towards and into the medicament container.

The method of transferring the fluid from the diluent container into the medicament container may be conducted by a fluid transfer device as described above. Insofar, all effects, features and benefits as described above in connection with the fluid transfer device, the pump device, the medicament container and the diluent container equally apply to the method of transferring the fluid from the diluent container into the medicament container; and vice versa.

In a further example of the method there is included the step of applying a positive pressure to the third fluid channel and transferring an amount of the fluid located in the medicament container through the second fluid channel into the first fluid channel and further into the medicament container or into some other container, e.g., into an infusion container or medicament administering container that may be connected to the first connecting portion instead or in addition to the diluent container.

Also here, positive pressure may be applied by the pump device, which may be operable to generate positive pressure and negative pressure on demand. In some examples the pump device may be implemented to alternatively generate a positive pressure and a negative pressure. In some examples the pump device comprises a syringe. The syringe may comprise a syringe barrel and a plunger movably disposed therein. The syringe barrel may comprise a tubularly-shaped barrel, which may be sealed by a movable plunger. Withdrawing the plunger in a direction out of the syringe may cause generation of a negative pressure inside the syringe barrel.

Moving the plunger in an opposite direction relative to the syringe barrel, e.g., inwardly relative to the syringe barrel may apply a positive pressure by way of which a gaseous or liquid substance located inside the syringe can be expelled through the outlet end of the syringe into the fluid transfer device. In some examples the pump device is exclusively configured to apply negative and positive gas pressures to the third connecting portion and hence to and/or through the third fluid channel of the fluid transfer device. Such positive and negative pressures lead to respective positive and negative pressures inside the medicament container, which is connected in a liquid and gas tight manner to the second connecting portion and hence to the second and first flow channels of the fluid transfer device.

According to a further example the method includes the step of keeping the medicament container in a first orientation during applying negative pressure to the third fluid channel. The method further includes turning the medicament container into a second orientation after having applied negative pressure to the third fluid channel and keeping the medicament container in the second orientation during applying the positive pressure to the third fluid channel. When or before applying a negative pressure to the third fluid channel the medicament container may be held in an upright configuration, e.g., with the outlet end and/or with the pierceable seal of the container oriented upwardly.

Then and by applying a negative pressure there can be withdrawn a liquid substance from the diluent container through the respective first and second fluid channels into the medicament container from above. The liquid substance applied via the fluid transfer device into the medicament container may then be used to reconstitute and/or to dilute the medicament inside the medicament container. It may be then of particular benefit to flip the medicament container upside down, such that the liquid and reconstituted medicament can get in mechanical connection with the outlet end of the medicament container. Here, the reorientation into the upside-down configuration may lead to an immersing of the medicament container spike into the liquid or reconstituted medicament inside the interior of the medicament container.

Then and by applying a positive pressure into the medicament container, e.g., by applying a positive gas pressure into the medicament container via the pump device the internal pressure inside the medicament container may be increased, which may in turn lead to a respective transfer or expelling of the liquid medicament into the first spike aperture and further into the second fluid channel and finally into the first fluid channel by way of which the reconstituted medicament may be re-transferred into the diluent container for further dilution.

The diluted or reconstituted medicament re-transfer into the diluent container may be then ready for administering to a patient. For this, the medicament container may be provided with a further port or fluid transferring connector by way of which the medicament located inside the diluent container may be provided to a drug delivery device, e.g. to an injection needle, to a fluid guide and/or to an infusion line.

The method of transferring a fluid from a diluent container into a medicament container and the method of transferring the fluid from the medicament container back into the diluent container is typically to be conducted by a fluid transfer device as described above. Insofar, all effects, features and benefits as described above in connection with the fluid transfer device equally apply to the method of transferring the fluid from the diluent container to the medicament container; and vice versa.

According to another aspect the present disclosure relates to a further method of transferring of a fluid from a medicament container into one of the diluent container and an administering container by using a fluid transfer device. Here, the method comprises the steps of using the fluid transfer device and connecting a first connecting portion of the fluid transfer device to one of the diluent container and the administering container and to fluidically connect a first fluid channel of the first connecting portion with an interior of one of the diluent container or administering container. The method further comprises the step of connecting a second connecting portion of the fluid transfer device to the medicament container. Also, a second fluid channel of the second connecting portion of the fluid transfer device is fluidically connected with an interior of the medicament container. Here, the medicament container may already comprise or may already contain a liquid substance that has to be withdrawn or to be expelled from the medicament container towards and into the diluent container or administering container.

Then and in a further step there is applied a positive pressure to a third fluid channel, e.g., via the pump device usually connected to the third fluid channel, e.g., via the third connecting portion and a fourth fluid channel. The third fluid channel is fluidically connected or is fluidically communicating with the interior of the medicament container. Applying a positive pressure to the third fluid channel may cause a transferring of an amount of a fluid located in the medicament container through the second fluid channel into the first fluid channel and into one of the medicament container and the administering container.

This method may be implemented separate from and/or subsequent to the above-described method of transferring a fluid from the diluent container into the medicament container. The method of transferring the fluid from the medicament container into one of a diluent container and an administering container may be combined with the above-described method of transferring the fluid from the diluent container into the medicament container.

Also, the further method of transferring of a fluid from the medicament container into one of a diluent container and an administering container may be conducted by using a fluid transfer device as described above. Insofar, all features, effects and benefits as described above in connection with the fluid transfer device may equally apply to the further method of transferring of a fluid from the medicament container into one of a diluent container and an administering container; and vice versa.

In some examples the method of transferring of a fluid from the medicament container into one of a diluent container and an administering container may be implemented separately, provided that the medicament container contains a liquid medicament or liquid substance to be transferred into one of the diluent container and the administering container.

In another aspect the present disclosure also relates to a method of administering an injectable medicament, the method comprising the steps of preparing the injectable medicament by using a fluid transfer device for transferring a fluid between a diluent container and a medicament container, wherein the fluid transfer device comprises:

a body, a first connecting portion to connect to the diluent container, the first connecting portion comprising a first fluid channel to fluidically communicate with an interior of the diluent container, a second connecting portion to connect to the medicament container, the second connecting portion comprising a second fluid channel to fluidically communicate with an interior of the medicament container, a third fluid channel to fluidically communicate with the interior of the medicament container and to fluidically communicate with a pump device, wherein the first fluid channel merges into the second fluid channel to form a first flow path from the diluent container into the medicament container and to form a second flow path from the medicament container into the diluent container'.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about-4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g. a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly (A21), Arg (B31), Arg (B32) human insulin (insulin glargine); Lys (B3), Glu (B29) human insulin (insulin glulisine); Lys (B28), Pro (B29) human insulin (insulin lispro); Asp (B28) human insulin (insulin aspart); human insulin, wherein proline in position B28 is replaced by Asp, Lys, Leu, Val or Ala and wherein in position B29 Lys may be replaced by Pro; Ala (B26) human insulin; Des (B28-B30) human insulin; Des (B27) human insulin and Des (B30) human insulin.

Examples of insulin derivatives are, for example, B29-N-myristoyl-des (B30) human insulin, Lys (B29) (N-tetradecanoyl)-des (B30) human insulin (insulin detemir, Levemir®); B29-N-palmitoyl-des (B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-gamma-glutamyl)-des (B30) human insulin, B29-N-omega-carboxypentadecanoyl-gamma-L-glutamyl-des (B30) human insulin (insulin degludec, Tresiba®); B29-N—(N-lithocholyl-gamma-glutamyl)-des (B30) human insulin; B29-N-(ω-carboxyheptadecanoyl)-des (B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C (Efpeglenatide), HM-15211, CM-3, GLP-1 Eligen, ORMD-0901, NN-9423, NN-9709, NN-9924, NN-9926, NN-9927, Nodexen, Viador-GLP-1, CVX-096, ZYOG-1, ZYD-1, GSK-2374697, DA-3091 March-701, MAR709, ZP-2929, ZP-3022, ZP-DI-70, TT-401 (Pegapamodtide), BHM-034. MOD-6030, CAM-2036, DA-15864, ARI-2651, ARI-2255, Tirzepatide (LY3298176), Bamadutide (SAR425899), Exenatide-XTEN and Glucagon-Xten.

An example of an oligonucleotide is, for example: mipomersen sodium (Kynamro®), a cholesterol-reducing antisense therapeutic for the treatment of familial hypercholesterolemia or RG012 for the treatment of Alport syndrom.

Examples of DPP4 inhibitors are Linagliptin, Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present invention include, for example, Fab fragments, F(ab') 2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, small modular immunopharmaceuticals (SMIP), binding-domain immunoglobulin fusion proteins, camelized antibodies, and immunoglobulin single variable domains. Additional examples of antigen-binding antibody fragments are known in the art.

The term "immunoglobulin single variable domain" (ISV), interchangeably used with "single variable domain", defines immunoglobulin molecules wherein the antigen binding site is present on, and formed by, a single immunoglobulin domain. As such, immunoglobulin single variable domains are capable of specifically binding to an epitope of the antigen without pairing with an additional immunoglobulin variable domain. The binding site of an immunoglobulin single variable domain is formed by a single heavy chain variable domain (VH domain or VHH domain) or a single light chain variable domain (VL domain). Hence, the antigen binding site of an immunoglobulin single variable domain is formed by no more than three CDRs. An immunoglobulin single variable domain (ISV) can be a heavy chain ISV, such as a VH (derived from a conventional four-chain antibody), or VHH (derived from a heavy-chain antibody), including a camelized VH or humanized VHH. For example, the immunoglobulin single variable domain may be a (single) domain antibody, a "dAb" or dAb or a Nanobody® ISV (such as a VHH, including a humanized VHH or camelized VH) or a suitable fragment thereof. [Note: Nanobody® is a registered trademark of Ablynx N.V.]; other single variable domains, or any suitable fragment of any one thereof.

"VHH domains", also known as VHHs, VHH antibody fragments, and VHH antibodies, have originally been described as the antigen binding immunoglobulin variable domain of "heavy chain antibodies" (i.e., of "antibodies devoid of light chains"; Hamers-Casterman et al. 1993 (Nature 363:446-448). The term "VHH domain" has been chosen in order to distinguish these variable domains from the heavy chain variable domains that are present in conventional 4-chain antibodies (which are referred to herein as "VH domains") and from the light chain variable domains that are present in conventional 4-chain antibodies (which are referred to herein as "VL domains"). For a further description of VHH's, reference is made to the review article by Muyldermans 2001 (Reviews in Molecular Biotechnology 74:277-302).

For the term "dAb's" and "domain antibody", reference is for example made to Ward et al. 1989 (Nature 341:544), to Holt et al. 2003 (Trends Biotechnol. 21:484); as well as to WO 2004/068820, WO 2006/030220, WO 2006/003388. It should also be noted that, although less preferred in the context of the present invention because they are not of mammalian origin, single variable domains can be derived from certain species of shark (for example, the so-called "IgNAR domains", see for example WO 2005/18629).

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen.

Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present invention, which encompass such modifications and any and all equivalents thereof.

An example drug delivery device may involve a needle-based injection system as described in Table 1 of section 5.2 of ISO 11608-1:2014 (E). As described in ISO 11608-1:2014 (E), needle-based injection systems may be broadly distinguished into multi-dose container systems and single-dose (with partial or full evacuation) container systems. The container may be a replaceable container or an integrated non-replaceable container.

As further described in ISO 11608-1:2014 (E), a multi-dose container system may involve a needle-based injection device with a replaceable container. In such a system, each container holds multiple doses, the size of which may be fixed or variable (pre-set by the user). Another multi-dose container system may involve a needle-based injection device with an integrated non-replaceable container. In such a system, each container holds multiple doses, the size of which may be fixed or variable (pre-set by the user).

As further described in ISO 11608-1:2014 (E), a single-dose container system may involve a needle-based injection device with a replaceable container. In one example for such a system, each container holds a single dose, whereby the entire deliverable volume is expelled (full evacuation). In a further example, each container holds a single dose, whereby a portion of the deliverable volume is expelled (partial evacuation). As also described in ISO 11608-1:2014 (E), a single-dose container system may involve a needle-based injection device with an integrated non-replaceable container. In one example for such a system, each container holds a single dose, whereby the entire deliverable volume is expelled (full evacuation). In a further example, each container holds a single dose, whereby a portion of the deliverable volume is expelled (partial evacuation).

BRIEF DESCRIPTION OF THE FIGURES

In the following, an example of a fluid transfer device, a kit containing the fluid transfer device and methods of using the fluid transfer device as described above in will be described in greater detail in the following detailed description by making reference to the drawings, in which.

DETAILED DESCRIPTION

Figure 1:
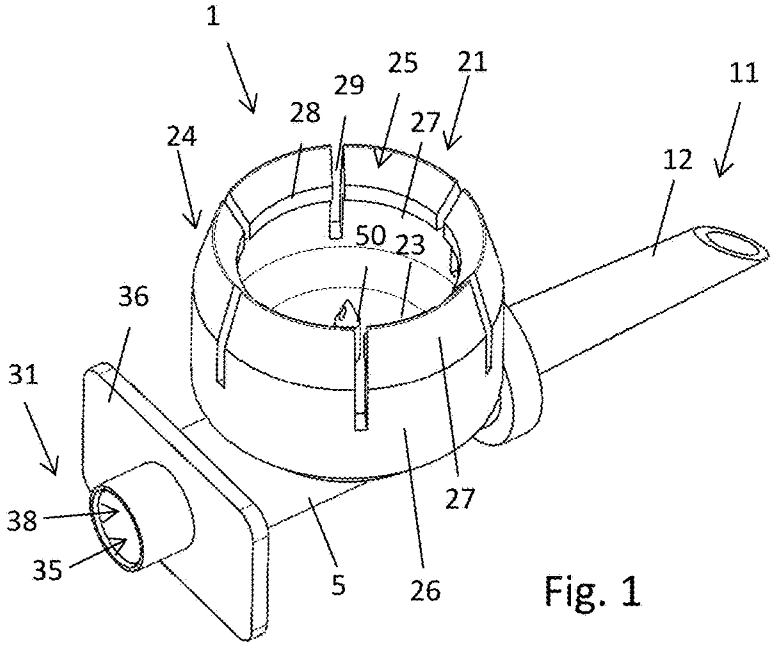
FIG. 1 illustrates one example of a fluid transfer device in a perspective illustration.

FIGS. 1-8 illustrate an example of a kit 70 comprising a fluid transfer device 1 to be selectively connected with a diluent container 100, a medicament container 200 and a pump device 300. The fluid transfer device 1 comprises a body 5. The body 5 comprises a first connecting portion 11, a second connecting portion 21 and a third connecting portion 31. The first connecting portion 11 is configured to connect the fluid transfer device 1 to a diluent container 100 and the second connecting portion 21 is configured to connect in a fluid communicating manner with a medicament container 200.

The diluent container 100 comprises a flexible and collapsible bag 101 with two separate port structures 103, 105. The flexible bag 101 may comprise one or several layers of a pliable sheet 108, which may be welded or seamed along a circumferential seam 106. The port structures 103, 105 may comprise a pierceable seal 104, which may be penetrable by a diluent container spike 12 of the fluid transfer device 1, which spike 12 is located at or coincides with the first connecting portion 11. In further examples (not illustrated) at least one of the port structures 103, 105 may comprise a standardized connector, such as a Luer-type connector for establishing a fluid transferring connection between the first fluid channel 10 as provided by or in the first connecting portion 11 and the interior 102 of the diluent container 100.

The second connecting portion 21 comprises a cup-shaped receptacle 25 for fastening or engaging with the medicament container 200. Here, a medicament container spike 50 may further extend through or into the receptacle 25 of the second connecting portion 21 and in particular through a bottom 23 of the receptacle 25, which is implemented to receive a barrel head 208 of the medicament container 200. The receptacle 25 comprises the bottom 23, which may be integrally formed with the body 5. The bottom 23 may comprise a surface normal that faces in longitudinal direction with regards to the elongation of the medicament container spike 50.

The receptacle 25 comprises a somewhat tubular sidewall 26 with numerous sidewall segments 27. The sidewall segments 27 may be elastically deformable radially outwardly with respect to the cylindrical geometry or tubular-shaped geometry of the receptacle 25. The sidewall 26 comprises numerous elongated sidewall segments 27, that are separated in circumferential direction by longitudinal slits 29. Each or some of the sidewall segments 27 comprise a snap feature 28 to engage in a snap-fitting manner with the barrel head 208 of the medicament container 200. The snap features 28 may be provided with a beveled section **28*a* that engages with the outer rim of the barrel head 208 as the barrel head 208 is pushed coaxially into the receptacle 25. The sidewall 26 may form or constitute a flexible skirt 24**.

Figure 6:
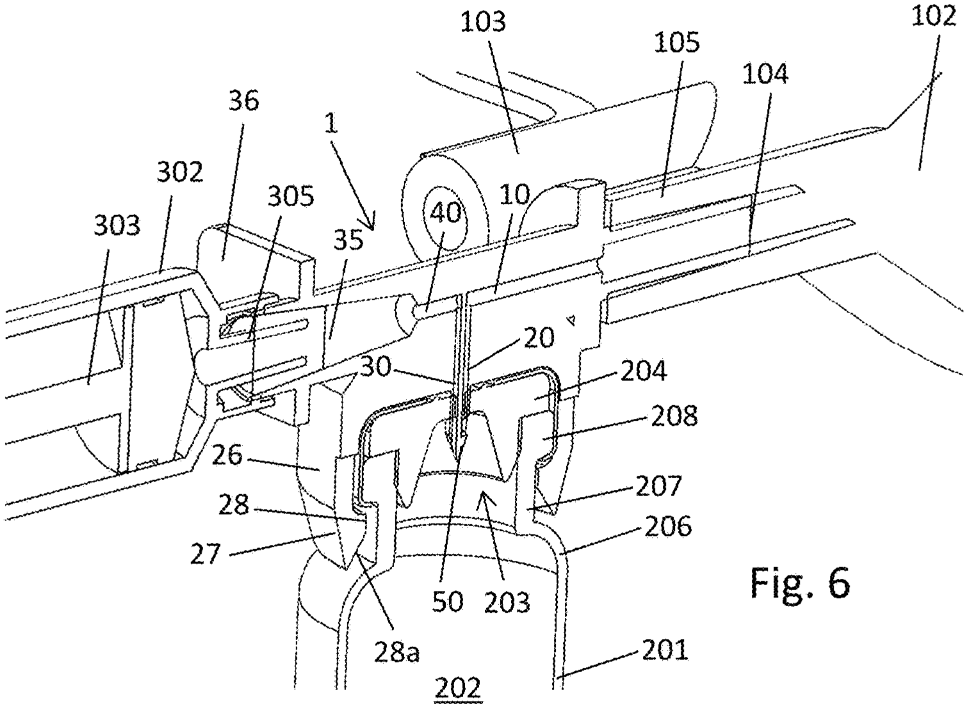
FIG. 6 shows a partial cross-section through the assembly according to FIG. 5.

As particularly illustrated in FIG. 6 and when the medicament container 200 is correctly attached to the second connecting portion 21 a radially narrowing shoulder portion 206 of a tubular shaped barrel 201 of the medicament container 200 is located outside the receptacle 25. A radially narrowed neck portion 207 of the barrel 201 may longitudinally align with the snap features 28 of the sidewall segments 27, while the snap features 28 grip under the radially widened barrel head 208 of the barrel 201 of the medicament container 200. When reaching this well-defined fastening configuration, the medicament container spike 50 has penetrated the pierceable seal 204, e.g. in form of a stopper provided at an outlet end of the medicament container 200. When reaching the final assembly configuration, the second fluid channel 20 and the third fluid separately extending into or through the medicament container spike 50 get in fluid communication with the interior 202 of the medicament container 200.

An outlet end of the barrel 201 is sealed by the pierceable seal 204, e.g., comprising a rubber septum. The seal 204 forms part of or constitutes a hermetic closure 203 of the medicament container 200.

The fluid transfer device may also comprise a the third connecting portion 31, which is configured to connect to a pump device 300. In the illustrated examples the pump device 300 comprises a syringe 301. The syringe 301 comprises a tubularly-shaped syringe barrel 302 and a plunger 303 longitudinally movable relative to the barrel 302. The syringe 301 comprises an outlet end provided with a counter connector 305 by way of which the syringe 301 may fluidically connect or communicate with a connector 35 of the second connecting portion 31 as illustrated in FIG. 6. The connector 35 and the counter connector 305 may comprise mutually corresponding beveled sidewalls or tapered sections 34, 304, e.g. in a region of a sidewall 33 of a receptacle 38 of the third connecting portion 31 and in the region of a complementary shaped stud of the counter connector 305.

Moreover, the connector 35 or the connecting portion 31 comprises a connector flange 36 for ease of gripping of the fluid transfer device 1.

Figure 7:
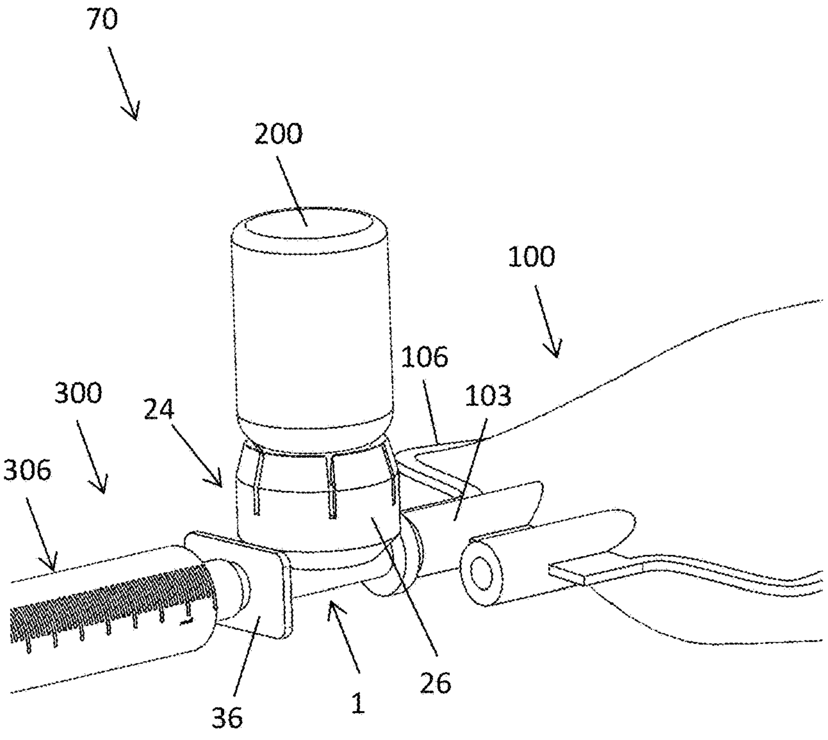
FIG. 7 shows an operation of the kit for transferring a fluid from the medicament container into the diluent container.

The syringe barrel 302 may be further provided with a visual scale 306 as indicated in FIG. 7. By way of the visual scale 306 and when the syringe barrel 302 is made of a transparent material the position of the plunger 303 inside the barrel 302 can be visually inspected and controlled. In this way, the degree or magnitude of a negative or positive pressure to be applied by the pump device 300 can be monitored and/or controlled.

Figure 8:
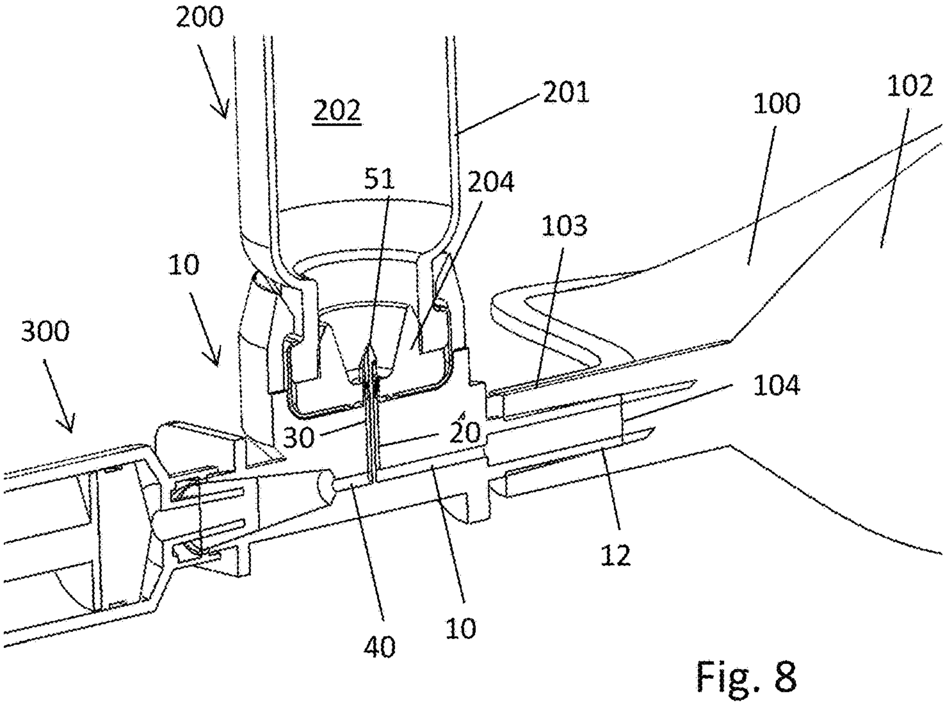
FIG. 8 is an enlarged cross section through the arrangement according to FIG. 7

The first connecting portion 11 comprises a diluent container spike 12. The diluent container spike 12 is configured to pierce or penetrate a pierceable seal 104 of the diluent container 100 as indicated in FIGS. 6 and 8. The diluent container spike 12 comprises a tubularly-shaped or tapered sidewall 13 with a tipped end 14. The sidewall 13 encloses a spike channel 15, which merges into a first fluid channel 10 extending inside the body 5 of the fluid transfer device 1.

The medicament container spike 50 comprises a distal end 51, which is tipped in order to pierce the pierceable seal 204 of the medicament container 200 as indicated in FIGS. 6 and 8.

The fluid transfer device 1 further comprises a second fluid channel 20, which is in permanent fluid communication with the first fluid channel 10. The fluid transfer device 1 further comprises a third fluid channel 30, which is separated from the second fluid channel 20. The second fluid channel 20 and the third fluid channel 30 may extend parallel to each other. The second fluid channel 20 and the third fluid channel 30 may both extend through or into the medicament container spike 50.

Figure 2:
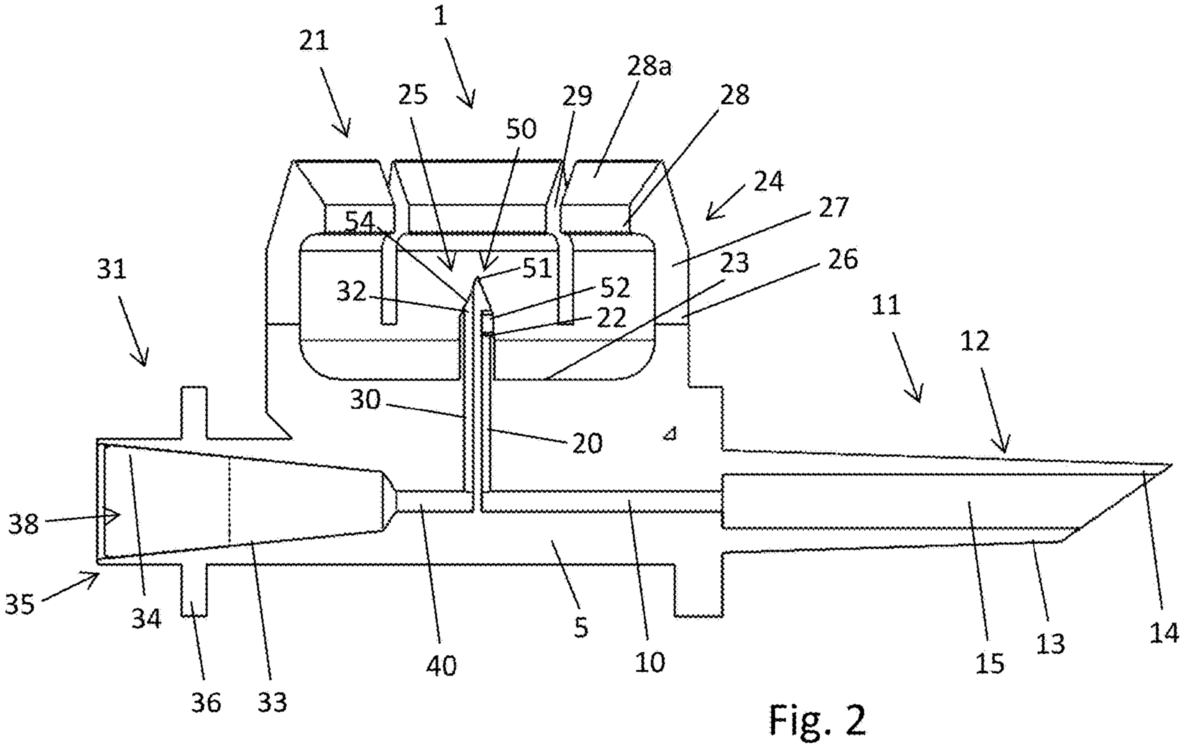
FIG. 2 shows the fluid transfer device according to FIG. 1 in a longitudinal cross-section.
Figure 3:
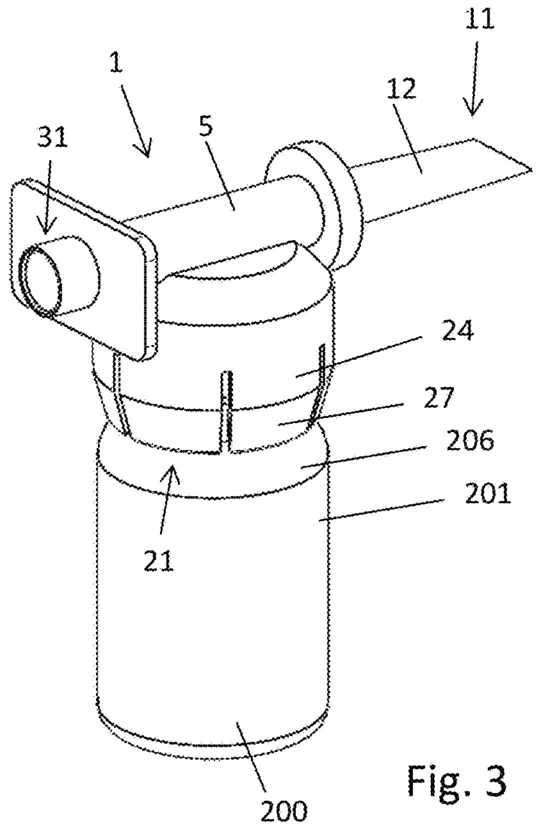
FIG. 3 is a perspective illustration of the fluid transfer device connected to a medicament container.
Figure 4:
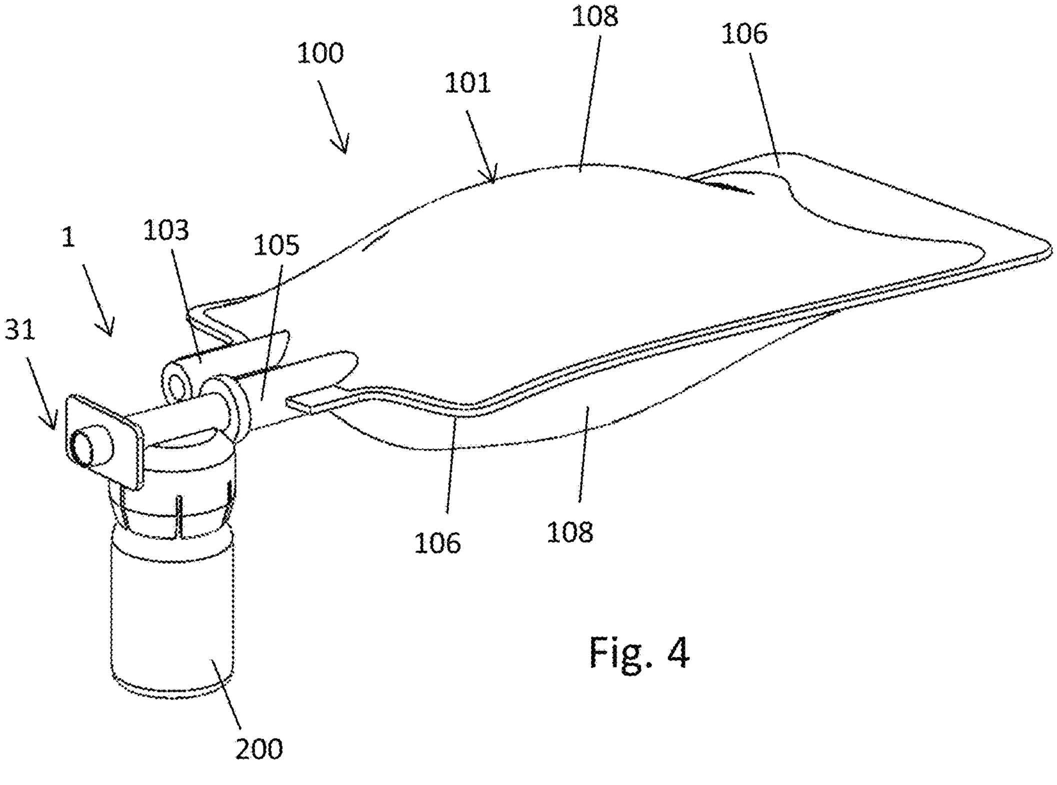
FIG. 4 shows the fluid transfer device connected to the medicament container and to a diluent container.

The medicament container spike 50 comprises a first spike aperture 52, which is in fluid communication with the second fluid channel 20. As indicated in FIG. 2 a distal end 22 of the second fluid channel 20 merges into the first spike aperture 52. Likewise, the medicament container spike 50 comprises a second spike aperture 54, e.g., in close vicinity to the distal end 51 of the medicament container spike 50. The second spike aperture 54 merges with a distal end 32 of the third fluid channel 30. An opposite end of the third fluid channel 30 merges into a fourth fluid channel 40.

As shown in FIG. 2 the fourth fluid channel 40 is in permanent fluid communication with a receptacle 38 of a connecting portion 31 of the body 5 of the fluid transfer device 1. Hence, the third fluid channel 30 is in permanent fluid communication with the fourth fluid channel 40. Likewise, the proximal end of the second fluid channel 20, i.e., that end of the second fluid channel 20 located opposite to the distal end 22 merges into the first fluid channel 10. The diluent container 100 is fluidically connected with the first connecting portion 11, such that the first fluid channel 10 is in fluid communication with an interior 102 of the diluent container 100. When the medicament container 200 is connected with the second connecting portion 21, such that the medicament container spike 50 is located inside the interior 202 of the medicament container 200, as e.g. illustrated in FIGS. 6 and 8, and further, when the third connecting portion 31 is connected with the pump device 300 as shown in FIG. 5, negative pressure can be applied onto the third channel 30, namely by withdrawing the plunger 303 away from the syringe barrel 302 thereby generating a negative pressure inside the syringe barrel 302.

Due to the fluid communication between the pump device 300 and the fourth fluid channel 40 the respective negative pressure transfers into the third fluid channel 30. In the orientation of the medicament container 200 as illustrated in FIG. 5 there will be then applied a negative pressure into the interior 202 of the medicament container 210 which transfers as a negative pressure into the second fluid channel 20 and further into the first fluid channel 10. By such a transfer of a negative pressure to the interconnected fluid channels an amount of a liquid or diluent provided in the interior 102 of the diluent container 100 is then transferred into the first fluid channel 10 and into the second fluid channel 20 along the first flow path.

Figure 5:
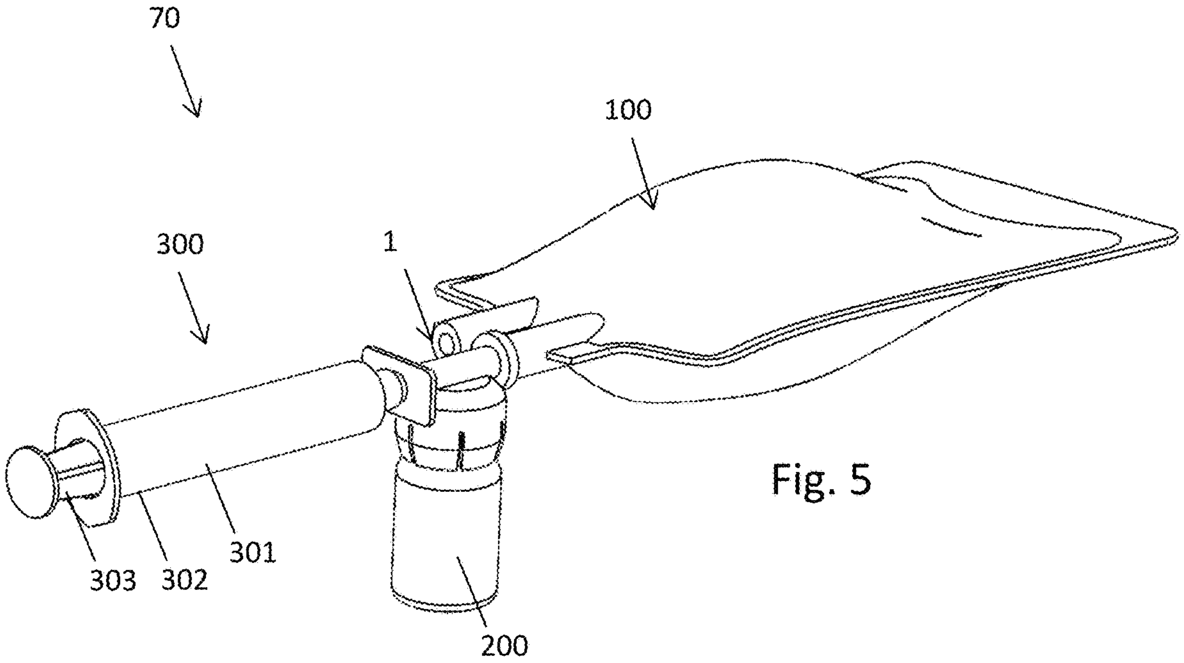
FIG. 5 shows the fluid transfer device, the diluent container, the medicament container and the pump device mutually connected.

As a consequence, a respective amount of a diluent will enter the interior 202 of the medicament container 200 from above as shown in the illustration of FIGS. 5 and 6. Here, the medicament container 200 is in a first orientation with the barrel head 208 located at an upper end the liquid diluent transferred into the interior 202 of the medicament container 200 will be entrapped inside the medicament container 200.

Subsequently, the medicament located inside the medicament container 200 can be mixed with the diluent. For instance, the lyophilized medicament located inside the container 200 may be reconstituted by mixing or diluting with the diluent. Thereafter the orientation of the medicament container 200 or the orientation of the entirety 20 may be flipped into an upside-down configuration as is immediately apparent from a comparison of FIGS. 5 and 7. In the upside-down configuration as shown in FIG. 7 the liquid substance previously introduced into the medicament container 200 is now at the open end of the barrel 201 and near the pierceable seal 204.

In this way, the free end and hence the distal end 51 of the medicament container spike 50, which is provided with the spike apertures 52, 54 will be immersed in the liquid or liquid medicament located inside the interior 202 of the medicament container 200. Then, there may be applied a positive pressure by the pump device 300, e.g. by moving the plunger 303 longitudinally inwardly into the syringe barrel 302. The positive pressure, e.g., a positive gas pressure, may be transferred back along a fourth flow path from the pump device 300 through the fourth fluid channel 40 into the third fluid channel 30 and further into the interior 202 of the medicament container 200.

This positive pressure leads to an increase of the interior pressure inside the medicament container 200. Since the liquid is in fluid communication with the first spike aperture 52 and hence with the second flow channel the increase of the inside pressure leads to or induces a transfer of the liquid medicament or fluid inside the medicament container 200 into the second fluid channel 20 and further into the first fluid channel 10 and even further into the diluent container 100 along the second flow path.

In this way there can be provided an alternating transfer of a diluent from the diluent container 100 into the medicament container 200, e.g., along a first flow path. Also, and by applying a positive pressure with the pump device 300 the liquid substance can be transferred from the medicament container 200 back into the diluent container 100 along a second flow path, which is directly opposite the first flow path.

A fluid flow along the first flow path may be induced or may be caused by a negative pressure applied along or in a third flow path, namely by applying a negative pressure along a third flow path from the interior 202 of the medicament container 200 into the third fluid channel 30 and further into the fourth fluid channel 40. The fluid flow along the second flow path may be induced by applying positive pressure along the fourth flow path, namely from the pump device 300 into the fourth flow channel 40 and further into the third flow channel 30 and finally into the medicament container 200.

The fluid transfer device 1 and the kit 70 provide a rather intuitive and easy approach to transfer a liquid diluent from a diluent container 100 into a medicament container 200 and back from the medicament container 200 into the diluent container 100 without the necessity to disconnect or to reconnect any of the fluid carrying or fluid transferring components or structures. In this way, the entire kit is operable quite intuitively and safely and serves to prevent any contamination in the course of e.g., reconstituting a lyophilized medicament, which may be initially contained inside the medicament container 200.

Figure 9:
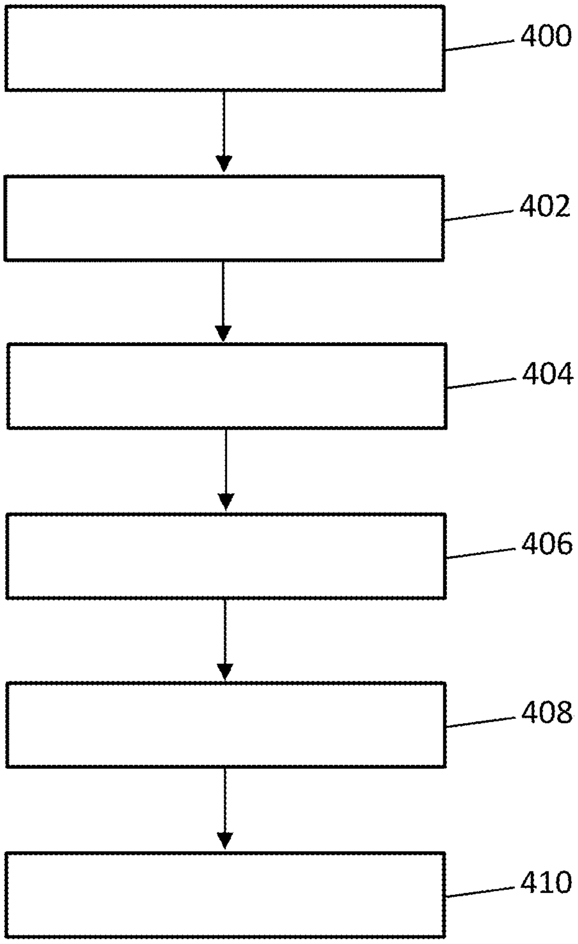
FIG. 9 is a flowchart of a method of transferring a fluid the between the diluent container and the medicament container.

The flowchart according to FIG. 9 is illustrative of a method of using the fluid transfer device 1 as described herein. Here, in a first step 400 the entire kit 70 of at least the fluid transfer device 1 is provided and used. In step 402 the medicament container 200 may be connected to the second connecting portion 21. In step 404 the diluent container 100 is connected to the first connecting portion 11. The order of the steps 402, 404 may be also interchanged. In step 406 there is applied a negative pressure to the third fluid channel 30 by way of which there is induced a flow of a fluid the from the diluent container 100 into the fluid transfer device 1 and into the medicament container 200.

Here, application of a negative pressure to the third fluid channel 30 leads to the generation of a respective negative fluid pressure inside the medicament container 200, which serves to withdraw an amount of the diluent from the diluent container 100 through the first fluid channel 10, through the second fluid channel 20 and into the medicament container 200. In step 408 the orientation of the medicament container 200 and on the orientation of the entire kit 70 may be flipped. Hence, the medicament container initially oriented in an upright configuration may be turned upside down as illustrated in FIG. 7. In this way it can be provided that the medicament container spike 50, at least the first spike aperture 52 is immersed in the liquid or reconstituted medicament located inside the medicament container 200.

In step 410 there may be then apply a positive pressure with the pump device 300 into the third and fourth fluid channel 30, 40 by way of which an inside pressure inside the medicament container 200 can be increased, which pressure increase leads to the expelling of a liquid into the second fluid channel 20 and further into the first fluid channel 10 along the second flow path and hence from the medicament container 200 back into the diluent container 100.

In further examples, the diluent container 100 may be replaced by an infusion or medicament delivery container 100' (not illustrated), before expelling the medicament from the medicament container 200.

It should be further noted that the first spike aperture 52 may be located closer to an inside surface of the pierceable seal 204 in order to enable a restless emptying of the medicament container 200. Specifically, and when in the of the upside-down configuration as indicated in FIGS. 2 and 7 the second spike aperture 54 may be located further away from the bottom 23 of the receptacle 25 than the first spike aperture 52.

The separation of first and second spike aperture 52, 54 in longitudinal direction of the medicament container spike 50 is of particular benefit to avoid ingress of a purge gas into the liquid fraction or liquid content of the medicament container 200 when applying positive pressure by the syringe 310 and to ensure that the first spike aperture 52 is and remains in fluid communication with the liquid fraction located inside the medicament container 200.

The invention claimed is:

1. A fluid transfer device for transferring a fluid between a diluent container and a medicament container, the fluid transfer device comprising:
- a body;
- a first connecting portion configured to connect to the diluent container, the first connecting portion comprising a first fluid channel configured to fluidically communicate with an interior of the diluent container;
- a second connecting portion configured to connect to the medicament container, the second connecting portion comprising a second fluid channel configured to fluidically communicate with an interior of the medicament container; and
- a third fluid channel configured to fluidically communicate with the interior of the medicament container and to fluidically communicate with a pump device;
- wherein the first fluid channel merges into the second fluid channel;
- wherein when a negative pressure is applied to the third fluid channel, fluid is configured to flow from the diluent container into the medicament container; and
- wherein when a positive pressure is applied to the third fluid channel, fluid is configured to flow from the medicament container into the diluent container.

2. The fluid transfer device according to claim 1, comprising a fourth fluid channel configured to fluidically communicate with the pump device;
- wherein the fourth fluid channel merges into the third fluid channel to form a first flow path from the medicament container into the pump device and to form a second flow path from the pump device into the medicament container.

3. The fluid transfer device according to claim 1, wherein the body comprises a third connecting portion fluidically coupled to the third fluid channel, the third connecting portion comprises a mechanical connector configured to connect with a mechanical counter connector of the pump device in a fluid transferring manner.

4. The fluid transfer device according to claim 1, wherein the first connecting portion comprises a diluent container spike configured to penetrate a pierceable seal of the diluent container; and
- wherein the first fluid channel extends into or through the diluent container spike.

5. The fluid transfer device according to claim 1, wherein the second connecting portion comprises a cup-shaped receptacle confined by a bottom and by a sidewall;
- wherein the receptacle is shaped and configured to receive a barrel head of a barrel of the medicament container.

6. The fluid transfer device according to claim 1, wherein the second connecting portion comprises a medicament container spike configured to penetrate a pierceable seal of the medicament container.

7. The fluid transfer device according to claim 6, wherein the second fluid channel comprises a distal end and extends through the medicament container spike;
- wherein the distal end of the second fluid channel terminates in a first spike aperture.

8. The fluid transfer device according to claim 7, wherein the third fluid channel comprises a distal end and extends through the medicament container spike separate from the second fluid channel; and
- wherein the distal end of the third fluid channel terminates in a second spike aperture.

9. The fluid transfer device according to claim 8, wherein the first spike aperture is longitudinally offset from the second spike aperture with regards to a longitudinal extent of the medicament container spike.

10. The fluid transfer device according to claim 9, wherein the medicament container spike comprises a distal spike end; and
- wherein a longitudinal distance between the second spike aperture and the distal spike end is smaller than a longitudinal distance between the first spike aperture and the distal spike end.

11. A kit comprising:
- a fluid transfer device comprising:
  - a body;
  - a first connecting portion configured to connect to a diluent container, the first connecting portion comprising a first fluid channel configured to fluidically communicate with an interior of the diluent container;
  - a second connecting portion configured to connect to a medicament container, the second connecting portion comprising a second fluid channel configured to fluidically communicate with an interior of the medicament container;
  - a third fluid channel configured to fluidically communicate with the interior of the medicament container and to fluidically communicate with a pump device;

wherein the first fluid channel merges into the second fluid channel;

wherein when a negative pressure is applied to the third fluid channel, fluid is configured to flow from the diluent container into the medicament container; and wherein when a positive pressure is applied to the third fluid channel, fluid is configured to flow from the medicament container into the diluent container;

a diluent container connectable or connected to the first connecting portion of the fluid transfer device;

a medicament container connectable or connected to the second connecting portion of the fluid transfer device; and a pump device connectable or connected to the third fluid channel of the fluid transfer device.

12. A method of transferring a fluid from a diluent container into a medicament container, the method comprising:

using a fluid transfer device;

connecting a first connecting portion of the fluid transfer device to the diluent container and fluidically connecting a first fluid channel of the first connecting portion with an interior of the diluent container;

connecting a second connecting portion of the fluid transfer device to the medicament container and fluidically connecting a second fluid channel of the second connecting portion with an interior of the medicament container;

applying a negative pressure to a third fluid channel of the fluid transfer device fluidically communicating with the interior of the medicament container and transferring a first amount of a fluid located in the diluent container through the first fluid channel into the second fluid channel towards and into the medicament container; and applying a positive pressure to the third fluid channel and transferring an amount of a fluid located in the medicament container through the second fluid channel into the first fluid channel and into the diluent container.

13. The method according to claim 12, comprising:

keeping the medicament container in a first orientation during applying the negative pressure to the third fluid channel;

turning the medicament container into a second orientation; and keeping the medicament container in the second orientation during applying the positive pressure to the third fluid channel.

14. A method of transferring of a fluid between a medicament container into a diluent container or an administering container, the method comprising:

using a fluid transfer device;

connecting a first connecting portion of the fluid transfer device to the diluent container or the administering container and fluidically connecting a first fluid channel of the first connecting portion with an interior of the diluent container or the administering container;

connecting a second connecting portion of the fluid transfer device to the medicament container, and fluidically connecting a second fluid channel of the second connecting portion with an interior of the medicament container;

applying a positive pressure to a third fluid channel of the fluid transfer device fluidically communicating with the interior of the medicament container;

purging a first amount of a fluid located in the medicament container through the second fluid channel into the first fluid channel and into the diluent container or the administering container;

applying a negative pressure to the third fluid channel; and purging an amount of a fluid located in the diluent container or the administering container through the first fluid channel into the second fluid channel towards and into the medicament container.

* * * * *